United States Patent
Tsao et al.

(10) Patent No.: US 11,256,141 B1
(45) Date of Patent: Feb. 22, 2022

(54) PIXEL STRUCTURE

(71) Applicant: Au Optronics Corporation, Hsinchu (TW)

(72) Inventors: Fu-Chun Tsao, Hsinchu (TW); Yi-Chu Wang, Hsinchu (TW); Cheng-Wei Lai, Hsinchu (TW); Ssu-Han Li, Hsinchu (TW); Li-Min Chen, Hsinchu (TW); Wei-Cheng Cheng, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 17/235,951

(22) Filed: Apr. 21, 2021

(30) Foreign Application Priority Data

Aug. 12, 2020 (TW) ................................. 109127345

(51) Int. Cl.
  *G02F 1/1343* (2006.01)
  *G02F 1/1337* (2006.01)
(52) U.S. Cl.
  CPC .. *G02F 1/133707* (2013.01); *G02F 1/134309* (2013.01)
(58) Field of Classification Search
  None
  See application file for complete search history.

(56) References Cited

U.S. PATENT DOCUMENTS

| 8,477,276 | B2 | 7/2013 | Chung et al. |
| 10,078,246 | B2 | 9/2018 | Lin et al. |
| 2004/0174468 | A1* | 9/2004 | Yang ..................... G02F 1/1395 349/42 |
| 2011/0261277 | A1 | 10/2011 | Chung et al. |
| 2017/0052396 | A1 | 2/2017 | Cheng et al. |
| 2018/0074376 | A1 | 3/2018 | Lin et al. |

FOREIGN PATENT DOCUMENTS

| CN | 101840120 | 2/2012 |
| CN | 105182635 | 12/2015 |
| CN | 106569366 | 4/2017 |
| CN | 111123590 | 5/2020 |

* cited by examiner

*Primary Examiner* — James A Dudek
(74) *Attorney, Agent, or Firm* — JCIPRNET

(57) ABSTRACT

A pixel structure including a pixel electrode and an alignment electrode is provided. An outline of the pixel electrode is surrounded by first long and short sides, a second long side opposite to the first long side, and a second short side opposite to the first short side. The pixel electrode has a first opening, extending along the first long side, and a second opening, extending from the first opening toward the second long side. The first opening is narrower than the second opening. The alignment electrode is physically separated from the pixel electrode and includes a first extension portion adjacent to the second long side and two supplemental portions positioned at two ends of the first extension portion. The two supplemental portions both extend from the first extension portion toward the first long side and respectively along the first short side and the second short side.

29 Claims, 12 Drawing Sheets

PIXEL STRUCTURE

CROSS-REFERENCE TO RELATED APPLICATION

This application claims the priority benefit of Taiwan application serial no. 109127345, filed on Aug. 12, 2020. The entirety of the above-mentioned patent application is hereby incorporated by reference herein and made a part of this specification.

BACKGROUND

Technical Field

The disclosure relates to a member of an electronic device, and more particularly, to a pixel structure.

Description of Related Art

With the continuous innovation of display technology, pixel structures in display devices are also continuously improved. In terms of the liquid crystal display devices that are currently widely used, how the pixel structures achieve high transmittance has always been an issue of concern in the industry. For example, for the pixel structure of the liquid crystal display device, a variety of alignment technologies may be adopted to control the arrangement and tilt direction of the liquid crystal material. However, in order to achieve the wide viewing angle display effect, it is required to define different alignment directions in different regions, whereas the boundaries between different alignment regions are sacrificial regions which are unable to display contents normally. As a result, the transmittance of the pixel structure is limited.

SUMMARY

The disclosure provides a pixel structure, which may have a high transmittance render a favorable display effect.

A pixel structure according to an embodiment of the disclosure includes a pixel electrode and an alignment electrode. An outline of the pixel electrode is surrounded by a first long side, a first short side, a second long side, and a second short side, and the pixel electrode has a first opening and a second opening. The first long side is opposite to the second long side. The first short side is opposite to the second short side. The first opening substantially extends along the first long side, and the second opening extends from the first opening toward the second long side. A width of the first opening is smaller than a width of the second opening. The alignment electrode is physically separated from the pixel electrode and includes a first extension portion adjacent to the second long side and two supplemental portions positioned at two ends of the first extension portion. The two supplemental portions both extend from the first extension portion toward the first long side and respectively along the first short side and the second short side.

Based on the above, in the pixel structure according to the embodiment of the disclosure, the opening of the pixel electrode is used with a pattern of the alignment electrode, so that nodes where liquid crystal is tiltable are controlled to be located on the periphery of the pixel electrode in the process of defining an alignment of the liquid crystal. In this way, substantially the entire area of the pixel electrode may serve for display to achieve a higher display transmittance and render a favorable display effect.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
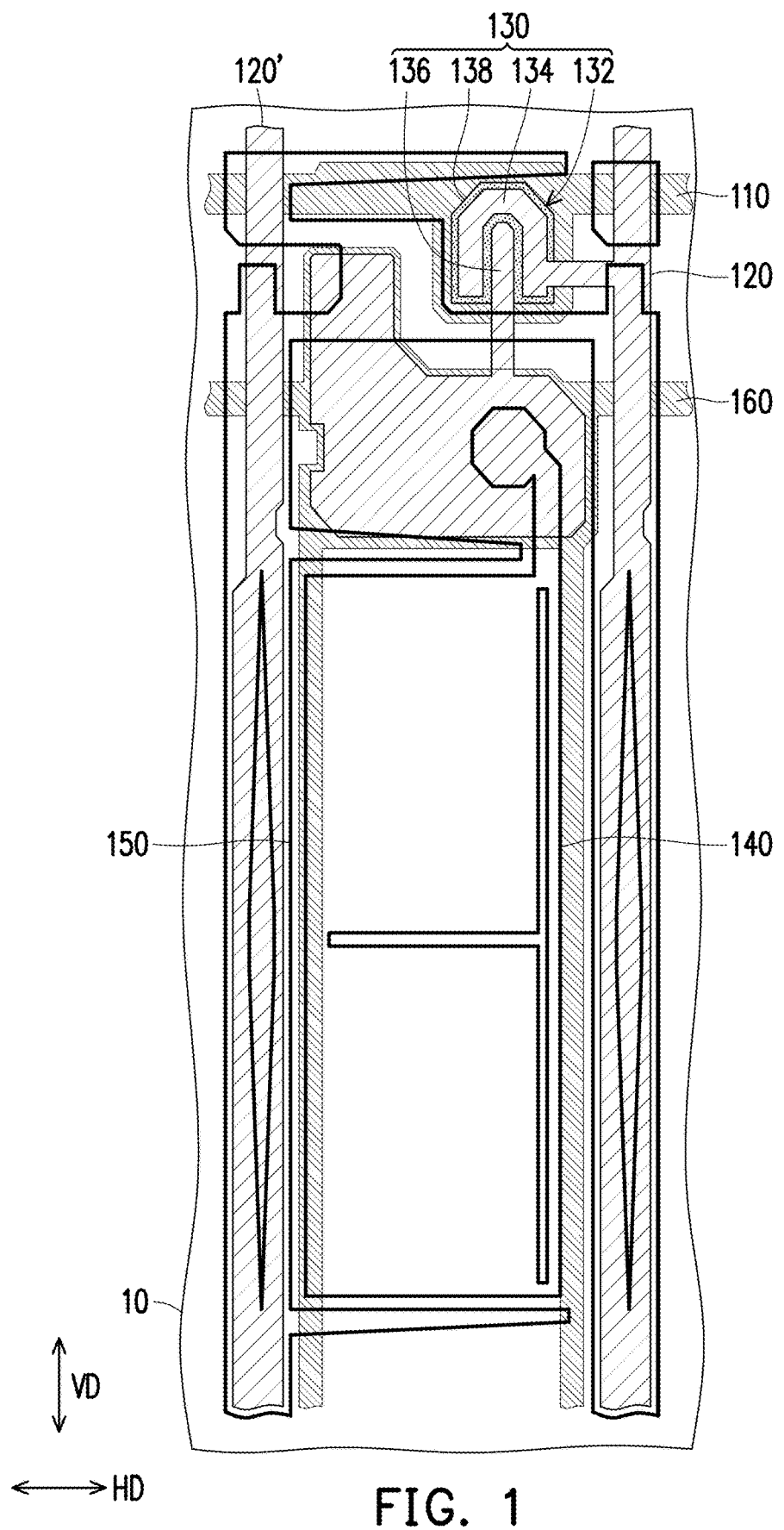
FIG. 1 is a schematic top view of a pixel structure according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

FIG. 1 is a schematic top view of a pixel structure according to an embodiment of the disclosure. In FIG. 1, a pixel structure 100 is, for example, disposed on a substrate 10, and the pixel structure 100 may include a scan line 110, a data line 120, an active device 130, a pixel electrode 140, an alignment electrode 150, and a common electrode 160. When the pixel structure 100 is applied to a liquid crystal display device, the substrate 10 may be vertically assembled with another substrate to sandwich a liquid crystal layer between the two substrates, and the pixel structure 100 may be used to form a driving electric field, so as to drive the liquid crystal layer sandwiched between the two substrates to display an image. In addition, in a real machine application, multiple pixel structures 100 may be disposed on the substrate 10, and the pixel structures 100 are arranged into an array. Therefore, a data line 120' in FIG. 1 is a wiring of another pixel structure, and is not directly connected to any members of the pixel structure 100 in FIG. 1.

Extension directions of the scan line 110 and the data line 120 intersect each other, and the scan line 110 and the data line 120 are, for example, conductive wirings respectively formed by conductive materials, e.g., metal, alloy, multilayer metal, multilayer alloy, and a stacked layer formed by metal and alloy, etc. Here, for ease of description, the extension direction of the scan line 110 may be described as a transverse direction HD, and the extension direction of the data line 120 may be described as a longitudinal direction VD. The transverse direction HD and the longitudinal direction VD may be perpendicular to each other or intersect each other at an angle. The pixel structure 100 is, for example, a structure having a larger dimension in the longitudinal direction VD than a dimension in the transverse direction HD. Therefore, the longitudinal direction VD may be a long axis direction, but the disclosure is not limited thereto.

The active device 130 is, for example, a transistor, and the active device 130 includes a gate 132, a source 134, a drain 136, and a semiconductor layer 138. The gate 132 may be connected to the scan line 110, and a material of the gate 132 includes a conductive material. In some embodiments, the gate 132 is substantially formed by a portion of the scan line 110 or a structure directly extending from the scan line 110. Therefore, the material of the gate 132 may be the same as a material of the scan line 110. The source 134 is connected to the data line 120. The drain 136 and the source 134 are spaced apart from each other, and both the source 134 and the drain 136 may be formed by a conductive material. In some embodiments, the source 134 may be formed by a structure directly extending from the data line 120. The data line 120, the source 134, and the drain 136 may be formed by patterning the same conductive material layer. The semiconductor layer 138 and the gate 132 overlap in a thickness direction, and a portion of the source 134 and a portion of the drain 136 are respectively disposed on the semiconductor layer 138. In this way, the semiconductor layer 138 is sandwiched between the gate 132 and the source 134, and also between the gate 132 and the drain 136.

The pixel electrode 140 may be connected to the drain 136 of the active device 130. When the active device 130 is turned on under the control of a signal of the scan line 110, the active device 130 may allow signal transmission between the source 134 and the drain 136. Therefore, a signal on the data line 120 may be input to the pixel electrode 140 through the source 134 and the drain 136, so that the pixel electrode 140 generates a required electric field. The pixel electrode 140 may be substantially a rectangular pattern, but the disclosure is not limited thereto.

The alignment electrode 150 substantially surrounds the pixel electrode 140 and is physically separated from the pixel electrode 140. When the pixel structure 100 is applied to a liquid crystal display device, the alignment electrode 150 cooperates with the pixel electrode 140 to define an alignment of a liquid crystal material. For example, the alignment electrode 150 and the pixel electrode 140 may be respectively input with corresponding voltages, and the electric field is generated between the alignment electrode 150 and the pixel electrode 140, so that the liquid crystal material is arranged and/or tilted in a specific manner. At this time, an appropriate curing step may be performed to form an alignment layer on a periphery of the liquid crystal layer. In this way, when the liquid crystal layer is subsequently driven for display, the liquid crystal layer may be tilted and arranged under the alignment of the alignment layer. Accordingly, a required display effect is achieved.

The common electrode 160 may overlap the drain 136 in the thickness direction, and may also overlap the pixel electrode 140, so as to form a required storage capacitor. The storage capacitor between the common electrode 160 and the pixel electrode 140 and the storage capacitor between the common electrode 160 and the drain 136 may be used to stabilize the display effect of the pixel structure 100. In some embodiments, the common electrode 160 and the scan line 110 may be formed by patterning the same conductive material layer. A portion of the common electrode 160 may be positioned between the pixel electrode 140 and the data line 120, which helps reduce the interference between the pixel electrode 140 and the data line 120, but the disclosure is not limited thereto.

Figure 2:
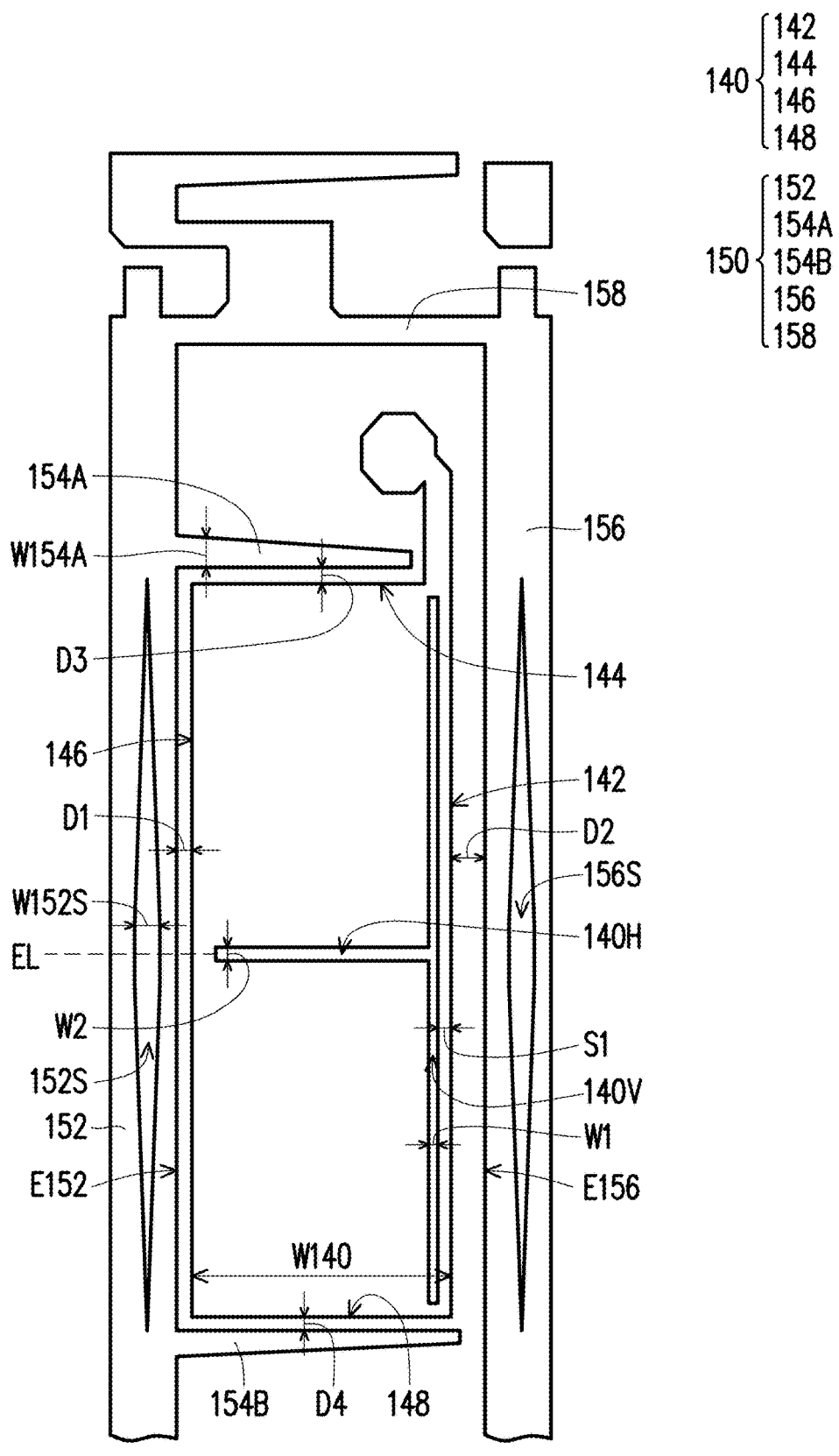
FIG. 2 shows a schematic view of a pixel electrode 140 and an alignment electrode 150.

FIG. 2 shows a schematic view of the pixel electrode 140 and the alignment electrode 150 for ease of description. An outline of the pixel electrode 140 is surrounded by a first long side 142, a first short side 144, a second long side 146, and a second short side 148. Here, the first long side 142, the first short side 144, the second long side 146, and the second short side 148 are, for example, sequentially arranged in a counterclockwise direction. The first long side 142 and the second long side 146 respectively extend, for example, along the longitudinal direction VD and are parallel to each other. The first short side 144 and the second short side 148 respectively extend, for example, along the transverse direction HD and are parallel to each other. Therefore, the pixel electrode 140 may have a substantially rectangular shape, but the disclosure is not limited thereto.

In addition, the pixel electrode 140 has a first opening 140V and a second opening 140H. The first opening 140V substantially extends along the first long side 142. The first opening 140V is a long and narrow opening, and the first opening 140V is close to the first long side 142 and away from the second long side 146. In some embodiments, a spacing distance S1 between the first opening 140V and the first long side 142 may be smaller than ¼ of a width W140 of the entire pixel electrode 140. In some embodiments, the spacing distance S1 is, for example, from 2.5 μm to 3 μm. The second opening 140H extends from the first opening 140V toward the second long side 146. In some embodiments, the second opening 140H may evenly divide the pixel electrode 140. That is, the second opening 140H may extend along a center line of the pixel electrode 140. Specifically, the second opening 140H may extend from a midpoint or a vicinity of the midpoint of the first opening 140V toward a direction away from the first long side 142 and close to the second long side 146. In this way, an extension direction of the first opening 140V is substantially in the longitudinal direction VD, and an extension direction of the second opening 140H is substantially in the transverse direction HD. The first opening 140V and the second opening 140H may form a substantially T-shaped opening structure. Nevertheless, the disclosure is not limited thereto. For example, in other embodiments, the second opening 140H may extend toward the first long side 142 and divide the first long side 142 into two sections. In addition, a width W1 of the first opening 140V may be smaller than a width W2 of the second opening 140H, where the width of the opening is, for example, a dimension measured in a direction perpendicular to the extension direction of each opening. In some embodiments, the width W1 of the first opening 140V and the width W2 of the second opening 140H may be fixed, but the disclosure is not limited thereto. In addition, the width W1 of the first opening 140V may be smaller than the spacing distance S1 between the first opening 140V and the first long side 142.

The alignment electrode 150 is physically separated from the pixel electrode 140. That is, a pattern of the alignment electrode 150 and a pattern of the pixel electrode 140 are not connected to each other. The alignment electrode 150 may include a first extension portion 152, two supplemental portions 154A and 154B, a second extension portion 156, and a connection portion 158. The pixel electrode 140 is, for example, positioned between the first extension portion 152 and the second extension portion 156, and is also positioned between the supplemental portion 154A and the supplemental portion 154B. The first extension portion 152 is adjacent to the second long side 146 of the pixel electrode 140, and the second extension portion 156 is adjacent to the first long side 142 of the pixel electrode 140. The supplemental portion 154A is adjacent to the first short side 144 of the pixel electrode 140, and the supplemental portion 154B is adjacent to the second short side 148 of the pixel electrode 140. The supplemental portion 154A and the supplemental portion 154B are both connected to the first extension portion 152, but each terminal of the supplemental portion 154A and the supplemental portion 154B is spaced apart from the second extension portion 156. The connection portion 158 connects the first extension portion 152 and the second extension portion 156, and the connection portion 158 may be connected to the alignment electrode in the adjacent pixel structure.

The supplemental portion 154A and the supplemental portion 154B both extend from the first extension portion 152 toward the first long side 142 of the pixel electrode 140. In this way, the first extension portion 152, the supplemental portion 154A, and the supplemental portion 154B form a tilted U-shaped structure. An opening of the U-shaped structure faces the first opening 140V of the pixel electrode 140, and the second opening 140H of the pixel electrode 140 extends from the first opening 140V toward a bottom of the U-shaped structure. In other words, the second opening 140H of the pixel electrode 140 substantially extends between the first opening 140V of the pixel electrode 140 and the first extension portion 152 of the alignment electrode 150.

The first extension portion 152 of the alignment electrode 150 has an inner side E152, and the inner side E152 may be substantially parallel to the second long side 146 of the pixel electrode 140. The second extension portion 156 of the alignment electrode 150 has an inner side E156, and the inner side E156 may be substantially parallel to the first long side 142 of the pixel electrode 140. The first extension portion 152 of the alignment electrode 150 is spaced apart from the second long side 146 of the pixel electrode 140 by a first spacing distance D1, and the second extension portion 156 of the alignment electrode 150 is spaced apart from the first long side 142 of the pixel electrode 140 by a second spacing distance D2. The first spacing distance D1 is shorter than the second spacing distance D2. The second spacing distance D2 is, for example, from 7 microns to 8 microns, but the disclosure is not limited thereto. In some embodiments, the second spacing distance D2 is, for example, 2 times to 2.5 times the first spacing distance D1.

In addition, the supplemental portion 154A extending from the first extension portion 152 is spaced apart from the first short side 144 of the pixel electrode 140 by a third spacing distance D3, and the supplemental portion 154B extending from the first extension portion 152 is spaced apart from the second short side 148 of the pixel electrode 140 by a fourth spacing distance D4. The third spacing distance D3 and the fourth spacing distance D4 are both, for example, equal to the first spacing distance D1. In other words, the spacing distance between the first extension portion 152 and the pixel electrode 140 is equal to the spacing distance between each of the two supplemental portions 154A and 154B and the pixel electrode 140. In this way, the U-shaped structure formed by the first extension portion 152, the supplemental portion 154A, and the supplemental portion 154B may be spaced apart from the pixel electrode 140 by a fixed spacing distance, while the second extension portion 156 may be spaced apart from the pixel electrode 140 by a longer spacing distance. The supplemental portion 154A and the supplemental portion 154B may have a design in which the widths thereof decrease in a direction away from the first extension portion 152 the narrower the width. For example, a width W154A of the supplemental portion 154A may gradually decrease outward from the first extension portion 152. More specifically, the width W154A may gradually decrease toward the second extension portion 156. The width of the supplemental portion 154B may be designed in a similar manner.

According to FIG. 2, the first extension portion 152 of the alignment electrode 150 has an extension portion opening 152S positioned therein. The extension portion opening 152S substantially extends in accordance with an extension direction of the first extension portion 152. A width W152S of the extension portion opening 152S increases toward the middle. An extension line EL of the second opening 140H of the pixel electrode 140 traverses the wide portion of the extension portion opening 152S. The extension portion opening 152S extends between the supplemental portion 154A and the supplemental portion 154B, and an extension length of the extension portion opening 152S is substantially close to a dimension of the pixel electrode 140 in the longitudinal direction VD.

In addition, the second extension portion 156 also has an extension portion opening 156S positioned therein. The extension portion opening 156S substantially extends in accordance with an extension direction of the second extension portion 156, and the extension portion opening 156S also has a shape that is wide in the middle and narrow at the ends. The extension line EL of the second opening 140H of the pixel electrode 140 may traverse the wide portion of the extension portion opening 156S. An extension length of the extension portion opening 156S is substantially close to the dimension of the pixel electrode 140 in the longitudinal direction VD.

Figure 3:
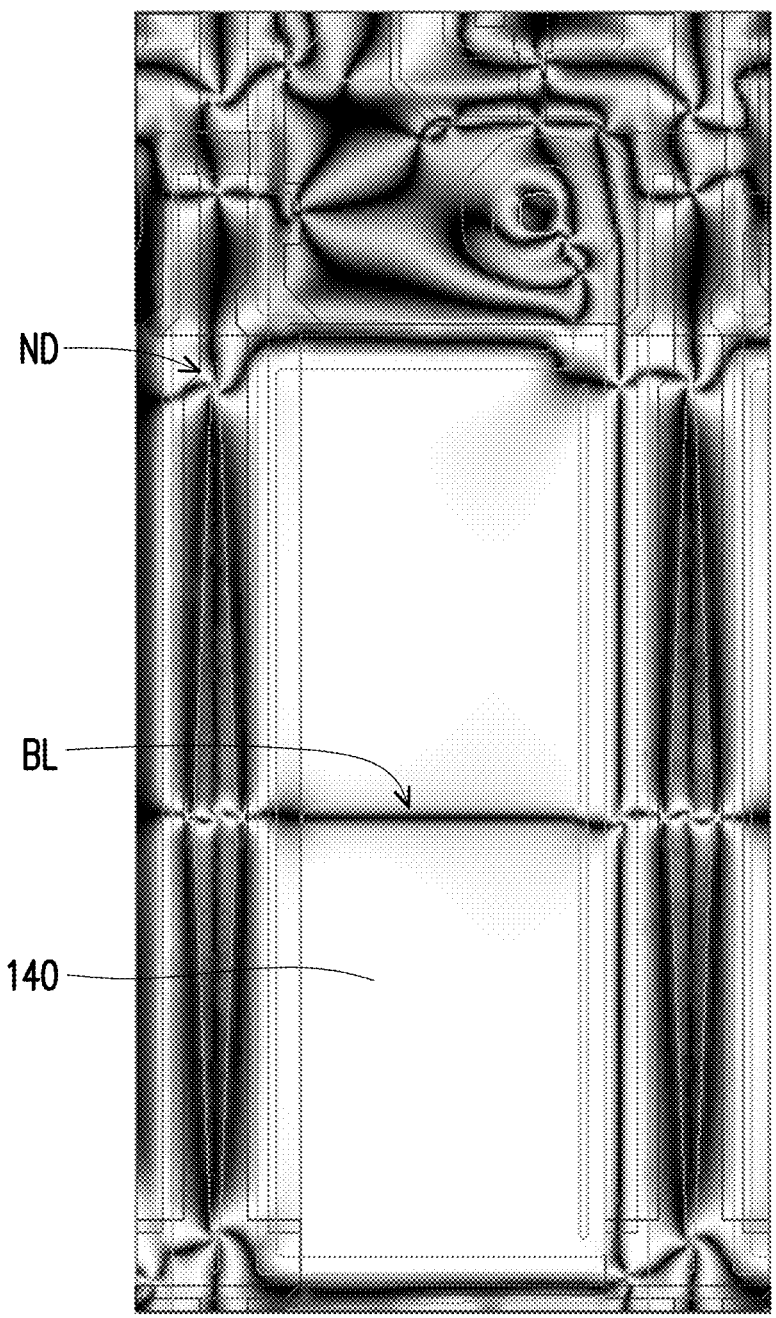
FIG. 3 is a simulation diagram of a liquid crystal effect when the pixel structure of FIG. 1 is used to perform an alignment procedure on a liquid crystal layer.

FIG. 3 is a simulation diagram of a liquid crystal effect when the pixel structure of FIG. 1 is used to perform an alignment procedure on the liquid crystal layer. Referring to FIGS. 1 and 3, when the pixel electrode 140 and the alignment electrode 150 are respectively applied with alignment voltages, liquid crystal molecules may be aligned and/or tilted in response to the electric field. Nodes ND and dark lines BL are generated at positions where the liquid crystal molecules are arranged and/or tilted unevenly and/or at interface positions, and the positions where the nodes ND and the dark lines BL appear are unable to exert a display function normally. According to FIG. 3, corresponding to designs of the patterns of the pixel electrode 140 and the alignment electrode 150, the nodes ND generally appear outside an area of the pixel electrode 140. In addition, only one dark line BL appears in the area of the pixel electrode 140, and the position of the dark line BL corresponds to the second opening 140H of the pixel electrode 140 in FIG. 2. In other words, in the area of the pixel electrode 140, except for the position of the dark line BL corresponding to the second opening 140H, the remaining area may exert an effective display function. Therefore, the design helps increase the display transmittance and render a favorable display effect.

Figure 4:
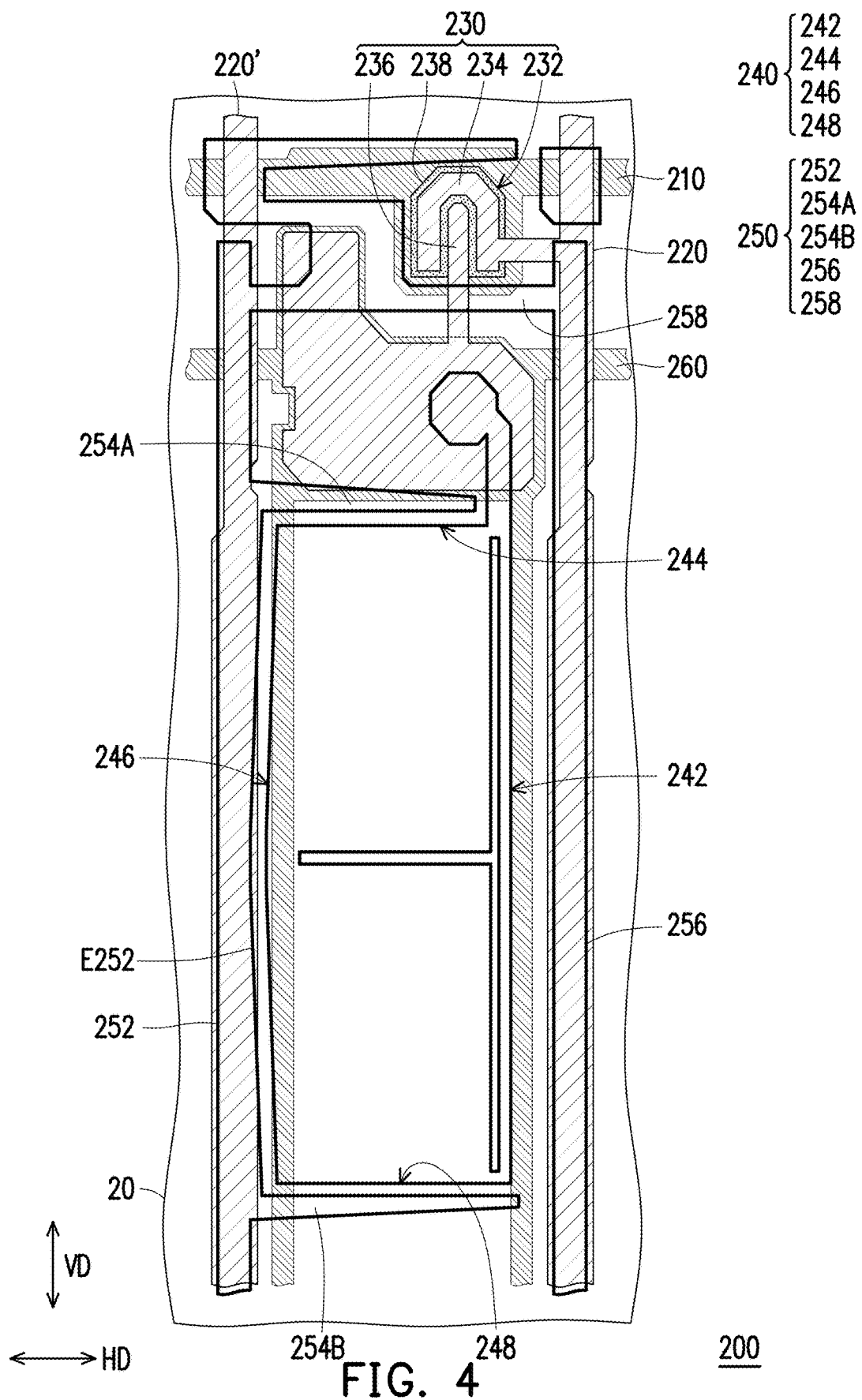
FIG. 4 is a schematic top view of a pixel structure according to another embodiment of the disclosure.

FIG. 4 is a schematic top view of a pixel structure according to another embodiment of the disclosure. A pixel structure 200 is, for example, disposed on a substrate 20, and the pixel structure 200 may include a scan line 210, a data line 220, an active device 230, a pixel electrode 240, an alignment electrode 250, and a common electrode 260. The scan line 210 intersects the data line 220. The active device 230 is connected to the scan line 210 and the data line 220, and the pixel electrode 240 is connected to the active device 230. An operation of the pixel structure 200 is, for example, that a scan signal transmitted by the scan line 210 turns on the active device 230, so as to allow a data signal on the data line 220 to be transmitted to the pixel electrode 240 through the active device 230. In FIG. 4, a data line 220' is a signal line connected to another pixel structure (not shown), but the data line 220' may extend through the pixel structure 200 shown in FIG. 4. A storage capacitor formed by the pixel electrode 240 and the common electrode 260 may store the data signal in the storage capacitor to maintain a signal of the pixel electrode 240. When the pixel structure 200 is applied to a display device, the signal of the pixel electrode 240 may be used to drive a display medium, such as a liquid crystal material, for display. In addition, the alignment electrode 250 is used to define the display medium, such as an alignment state of the liquid crystal material. For example, when the pixel structure 200 is applied to a liquid crystal display device, the liquid crystal material and an alignment material may be encapsulated between the substrate 20 and another substrate. During the alignment procedure, the alignment electrode 250 and the pixel electrode 240 may be applied with corresponding voltages to drive the liquid crystal material, so that the liquid crystal material is arranged and/or tilted in a specific manner. In a state where the liquid crystal material is arranged and/or tilted in the specific manner, a curing procedure, such as light curing and/or thermal curing, may be used to cure the alignment material to a periphery of the liquid crystal layer.

Figure 5:
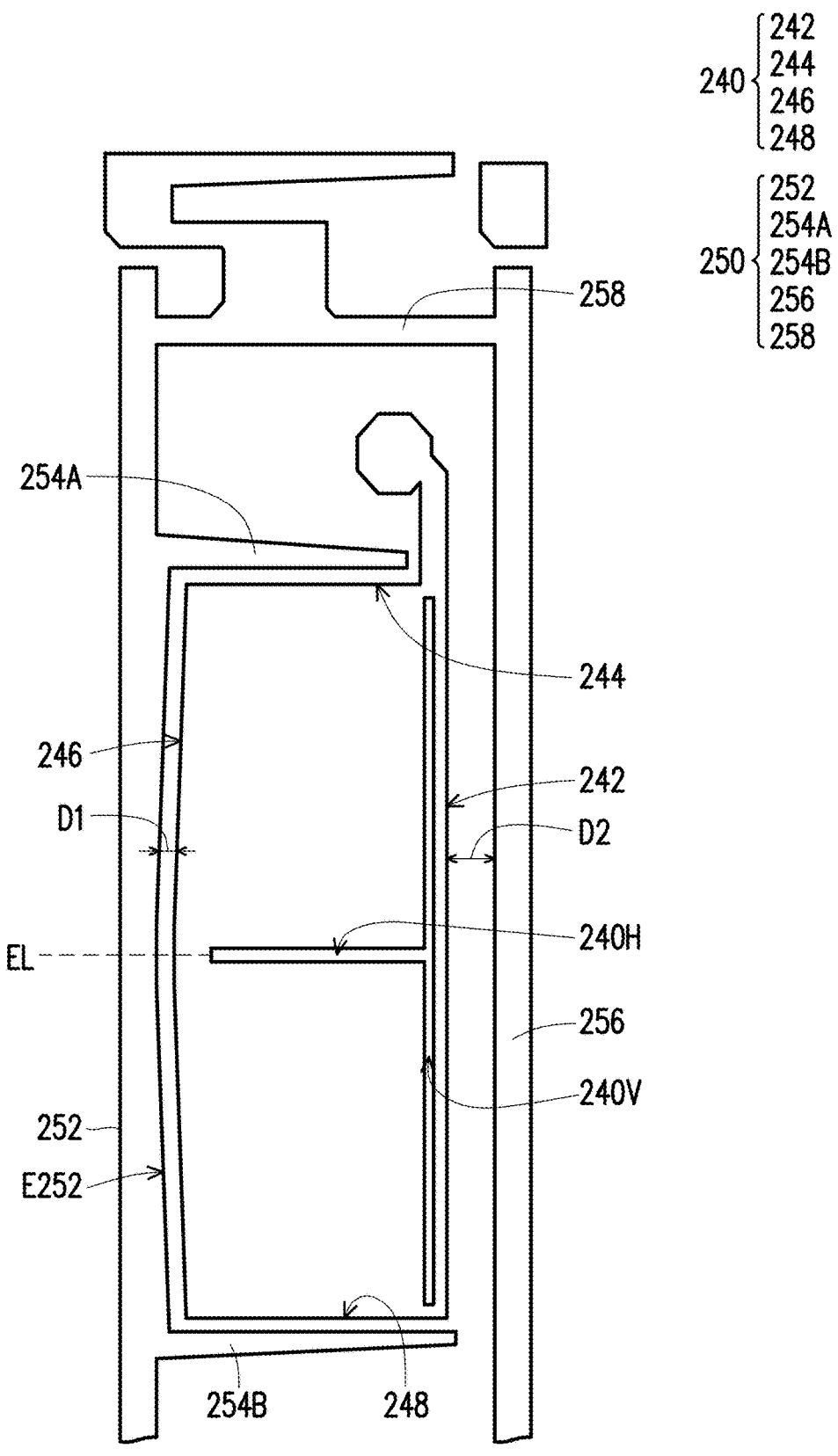
FIG. 5 is a schematic view of a pixel electrode and an alignment electrode in a pixel structure 200.

FIG. 5 is a schematic view of the pixel electrode and the alignment electrode in the pixel structure 200. Referring to both FIGS. 4 and 5, a pattern of the pixel electrode 240, for example, has a larger dimension in the longitudinal direction VD than a dimension in the transverse direction HD, and an outline of the pixel electrode 240 is substantially sequentially surrounded by a first long side 242, a first short side 244, a second long side 246, and a second short side 248 in a counterclockwise direction. In addition, the pixel electrode 240 has a first opening 240V extending along the first long side 242 and a second opening 240H extending from the first opening 240V toward the second long side 246. A pattern design of the pixel electrode 240 is substantially similar to that of the pixel electrode 140. However, the second long side 246 of the pixel electrode 240 is curve-like or polyline-like, and the first long side 242 is straight. In FIGS. 4 and 5, a distance between the first long side 242 and the second long side 246 in the pixel electrode 240, for example, along an extension direction of the first long side 242, that is, the longitudinal direction VD, shows a variation tendency of first increasing and then decreasing. In other words, the pixel electrode 240 has the design of the pattern that is wide in the middle and narrow at two ends.

The alignment electrode 250 is physically separated from the pixel electrode 240, and may include a first extension portion 252, a supplemental portion 254A, a supplemental portion 254B, a second extension portion 256, and a connection portion 258. The first extension portion 252 and the second extension portion 256 are positioned on opposite two sides of the pixel electrode 240. The first extension portion 252 is adjacent to the second long side 246 of the pixel electrode 240, and the second extension portion 256 is adjacent to the first long side 242 of the pixel electrode 240.

The supplemental portion 254A and the supplemental portion 254B are both connected to the first extension portion 252 and extend from the first extension portion 252 toward the second extension portion 256, but a terminal of the supplemental portion 254A and a terminal of the supplemental portion 254B are not connected to the second extension 256. In this embodiment, both the first extension portion 252 and the second extension portion 256 have solid patterns. A width of the first extension 252 is not constant. The width of the first extension portion 252 shows a variation tendency of first increasing and then decreasing along the second long side 246 of the pixel electrode 240, and the extension line EL of the second opening 240H may traverse the narrow portion of the first extension portion 252. In this embodiment, an inner side E252 of the first extension portion 252 adjacent to the second long side 246 and the second long side 246 are both curve-like or polyline-like, and a distance between the inner side E252 and the second long side 246 is constant. The first extension portion 252 of the alignment electrode 250 is spaced apart from the second long side 246 of the pixel electrode 240 by the first spacing distance D1, and the second extension portion 256 of the alignment electrode 250 is spaced apart from the first long side 242 of the pixel electrode 240 by the second spacing distance D2. The first spacing distance D1 is shorter than second spacing distance D2. In addition, a distance between the supplemental portion 254A and the pixel electrode 240 and a distance between the supplemental portion 254B and the pixel electrode 240 are also substantially equal to the first spacing distance D1. The design of the embodiment is similar to the design of the pixel structure 100.

Figure 6:
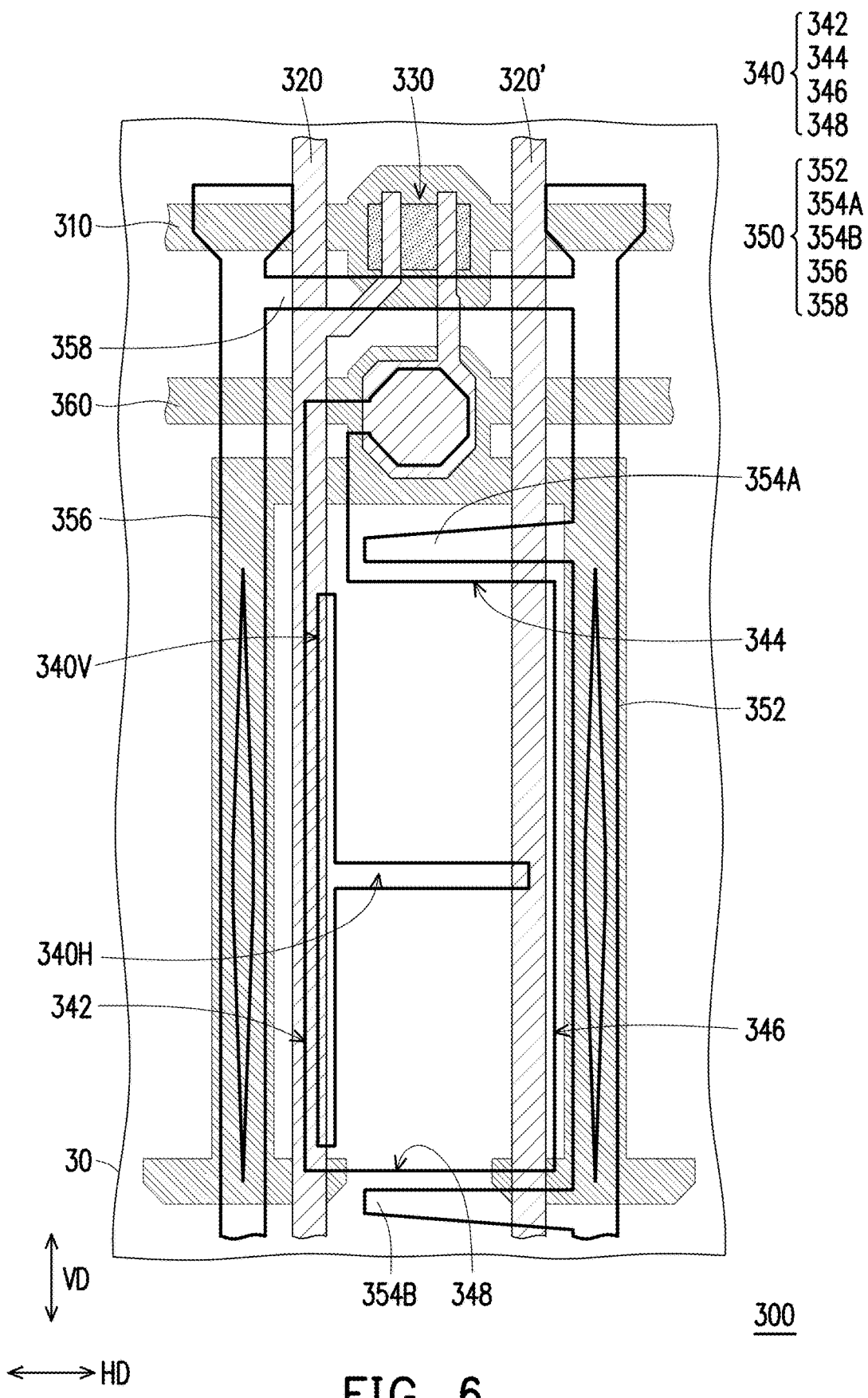
FIG. 6 is a schematic top view of a pixel structure according to still another embodiment of the disclosure.

FIG. 6 is a schematic top view of a pixel structure according to still another embodiment of the disclosure. A pixel structure 300 is, for example, disposed on a substrate 30, and the pixel structure 300 may include a scan line 310, a data line 320, an active device 330, a pixel electrode 340, an alignment electrode 350, and a common electrode 360. The scan line 310 intersects the data line 320. The active device 330 is connected to the scan line 310 and the data line 320, and the pixel electrode 340 is connected to the active device 330. In FIG. 6, a data line 320' is a signal line connected to another pixel structure (not shown), but the data line 320' may extend through the pixel structure 300 shown in FIG. 6. An operation of the pixel structure 300 is substantially similar to those of the pixel structures 100 and 200 of the previous embodiments. The alignment electrode 350 is used to define an alignment state of a display medium, such as a liquid crystal material. Reference is also drawn to the foregoing embodiments for the operations of the alignment electrode 350 and the pixel electrode 340 during the alignment procedure. In the top view, the pixel electrode 340 may partially overlap the data line 320 and another data line 320', and a portion of the alignment electrode 350 is partially positioned outside the data line 320 and the data line 320'.

Figure 7:
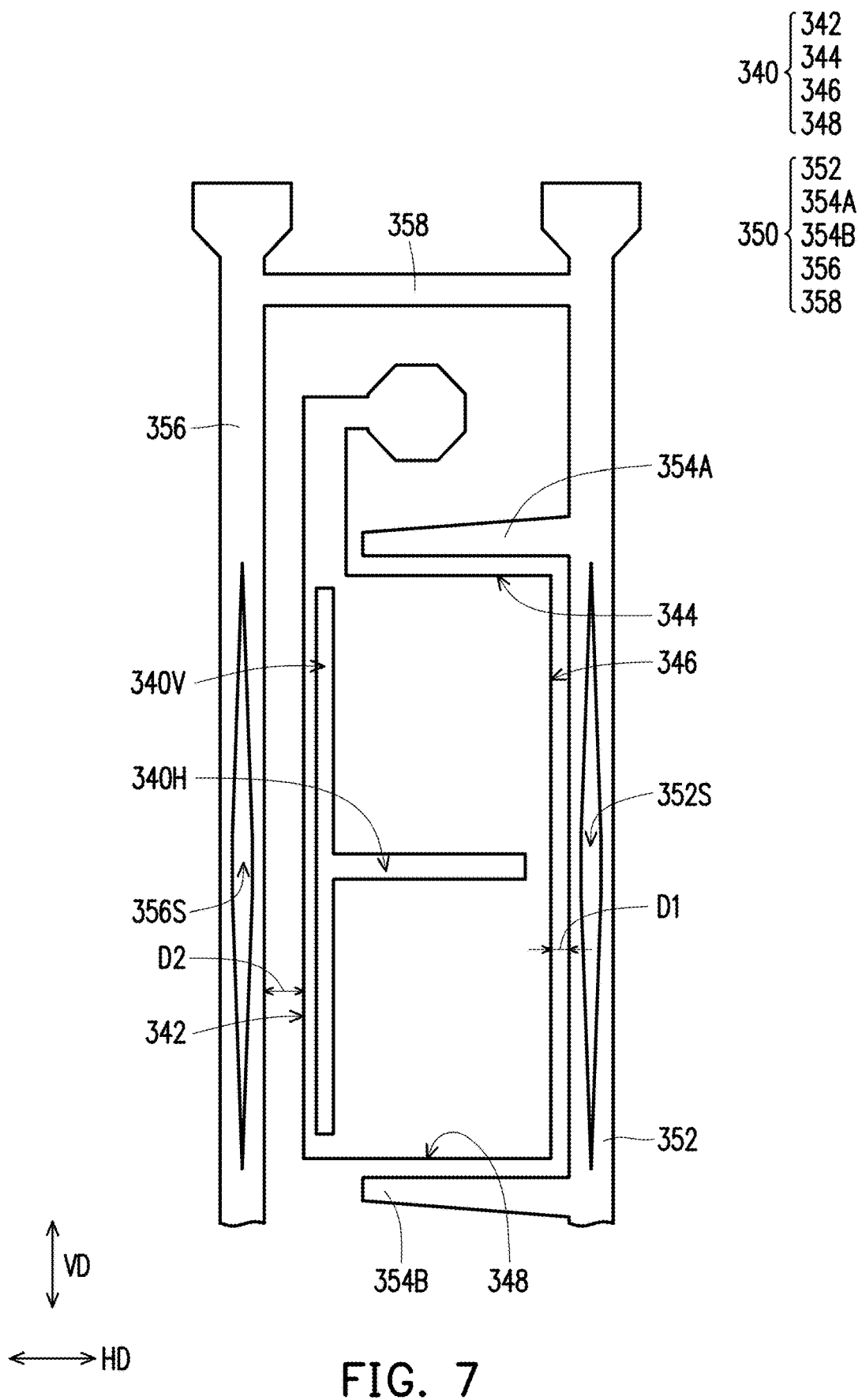
FIG. 7 is a schematic view of a pixel electrode and an alignment electrode in a pixel structure 300.

FIG. 7 is a schematic view of the pixel electrode and the alignment electrode in the pixel structure 300. Referring to both FIGS. 6 and 7, a pattern of the pixel electrode 340, for example, has a larger dimension in the longitudinal direction VD than a dimension in the transverse direction HD, and an outline of the pixel electrode 340 is substantially sequentially surrounded by a first long side 342, a first short side 344, a second long side 346, and a second short side 348 in a counterclockwise direction. In addition, the pixel electrode 340 has a first opening 340V extending along the first long side 342 and a second opening 340H extending from the first opening 340V toward the second long side 346. The first opening 340V and the second opening 340H are both positioned inside the pixel electrode 340, but the disclosure is not limited thereto. In other embodiments, the second opening 340H may further face the first long side 342 to divide the first long side 342 into two sections. The first opening 340V is close to the first long side 342 and away from the second long side 346, so a spacing distance between the first opening 340V and the first long side 342 may be longer than a spacing distance between the first opening 340V and the second long side 346. In some embodiments, the spacing distance between the first opening 340V and the first long side 342 may be smaller than ¼ of a spacing distance between the first long side 342 and the second long side 346.

The alignment electrode 350 is physically separated from the pixel electrode 340, and may include a first extension portion 352, a supplemental portion 354A, a supplemental portion 354B, a second extension portion 356, and a connection portion 358. The first extension portion 352 and the second extension portion 356 are positioned on opposite two sides of the pixel electrode 340. The first extension portion 352 is adjacent to the second long side 346 of the pixel electrode 340, and the second extension portion 356 is adjacent to the first long side 342 of the pixel electrode 340. The supplemental portion 354A and the supplemental portion 354B are both connected to the first extension portion 352 and extend from the first extension portion 352 toward the second extension portion 356, but a terminal of the supplemental portion 354A and a terminal of the supplemental portion 354B are not connected to the second extension portion 356. The first extension portion 352 of the alignment electrode 350 is spaced apart from the second long side 346 of the pixel electrode 340 by a first spacing distance D1, and the second extension portion 356 of the alignment electrode 350 is spaced apart from the first long side 342 of the pixel electrode 340 by a second spacing distance D2. The first spacing distance D1 is smaller than the second spacing distance D2. The second spacing distance D2 is, for example, from 7 microns to 8 microns, but the disclosure is not limited thereto. In some embodiments, the second spacing distance D2 is, for example, 2 to 2.5 times the first spacing distance D1. In general, designs of the patterns of the pixel electrode 340 and the alignment electrode 350 of the pixel structure 300 may be substantially symmetrical with the designs of the patterns of the pixel electrode 140 and the alignment electrode 150 of the pixel structure 100, but the disclosure is not limited thereto. In this embodiment, the first extension portion 352 and the second extension portion 356 may respectively have extension portion openings 352S and 356S, and designs of the extension portion openings 352S and 356S are substantially the same as those of the extension portion openings 152S and 156S.

According to FIG. 6, the data line 320 may be positioned between the second extension portion 356 of the alignment electrode 350 and the pixel electrode 340, and the data line 320' may be positioned between the first extension portion 352 of the alignment electrode 350 and the pixel electrode 340. In addition, the data line 320 may partially overlap the first opening 340V. Since the data line 320 and the data line 320' are formed by the a conductive metal material, the above configuration helps shield a position with a less favorable display effect in the periphery of the pixel electrode 340, and helps facilitate the display effect provided by the pixel structure 300.

Figure 8:
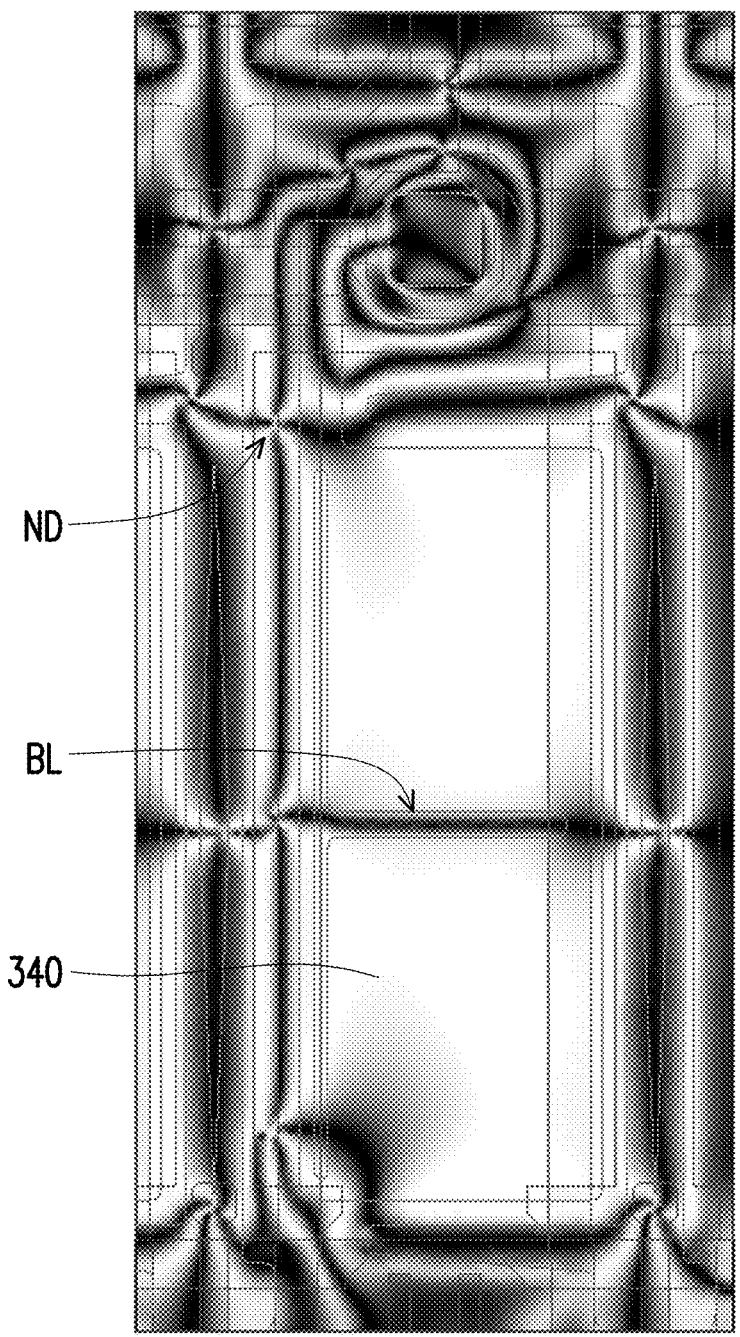
FIG. 8 is a simulation diagram of the liquid crystal effect when the pixel structure of FIG. 6 is used to perform an alignment procedure on the liquid crystal layer.

FIG. 8 is a simulation diagram of the liquid crystal effect when the pixel structure of FIG. 6 is used to perform an alignment procedure on the liquid crystal layer. Referring to FIGS. 8 and 6, when the pixel electrode 340 and the alignment electrode 350 are respectively applied with alignment voltages, liquid crystal molecules may be aligned and/or tilted in response to the electric field. The nodes ND and the dark lines BL may be generated at positions where the liquid crystal molecules are arranged and/or tilted unevenly and/or at interface positions, and the positions where the nodes ND and the dark lines BL appear are unable to exert a display function normally. According to FIG. 6, corresponding to the designs of the patterns of the pixel electrode 340 and the alignment electrode 350, the nodes ND generally appear outside an area of the pixel electrode 340. In addition, only one dark line BL appears in the area of the pixel electrode 340, and the position of the dark line BL corresponds to the second opening 340H of the pixel electrode 340 in FIG. 6. In other words, in the area of the pixel electrode 340, except for the position of the dark line BL corresponding to the second opening 340H, the remaining area may exert an effective display function. Therefore, such a design helps to increase the display transmittance and achieve an ideal display effect.

Figure 9:
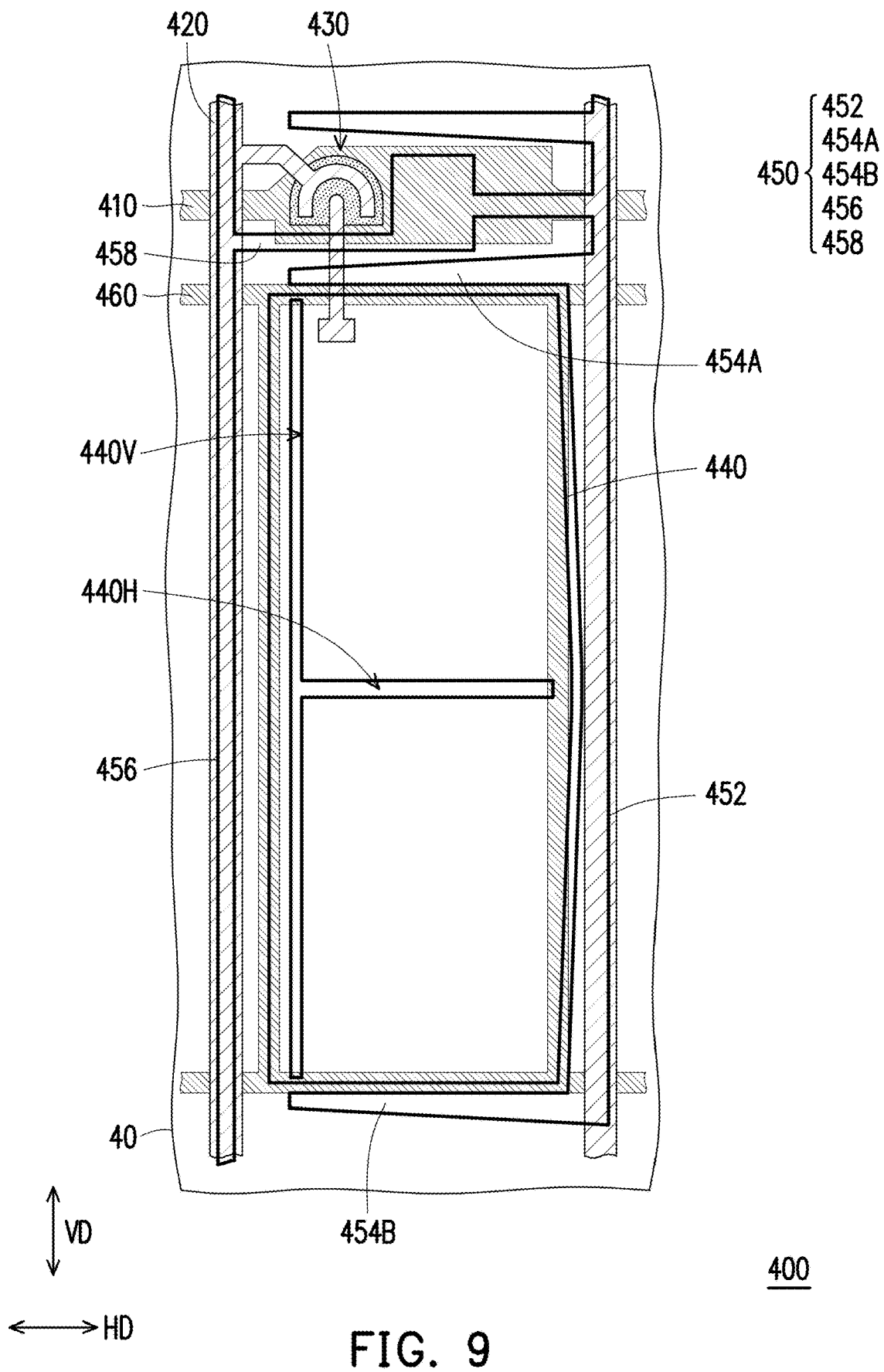
FIG. 9 is a schematic top view of a pixel structure according to another embodiment of the disclosure.

FIG. 9 is a schematic top view of a pixel structure according to another embodiment of the disclosure. A pixel structure 400 is, for example, disposed on a substrate 40, and the pixel structure 400 may include a scan line 410, a data line 420, an active device 430, a pixel electrode 440, an alignment electrode 450, and a common electrode 460. The scan line 410 intersects the data line 420. The active device 430 is connected to the scan line 410 and the data line 420, and the pixel electrode 440 is connected to the active device 430. An operation of the pixel structure 400 is substantially similar to those of the pixel structures 100, 200, and 300 of the previous embodiments, and thus the description will not be reiterated here. In addition, the alignment electrode 450 is used to define an alignment state of a display medium, such as a liquid crystal material. Reference is drawn to the foregoing embodiments for the operations of the alignment electrode 450 and the pixel electrode 440 during the alignment procedure.

Figure 10:
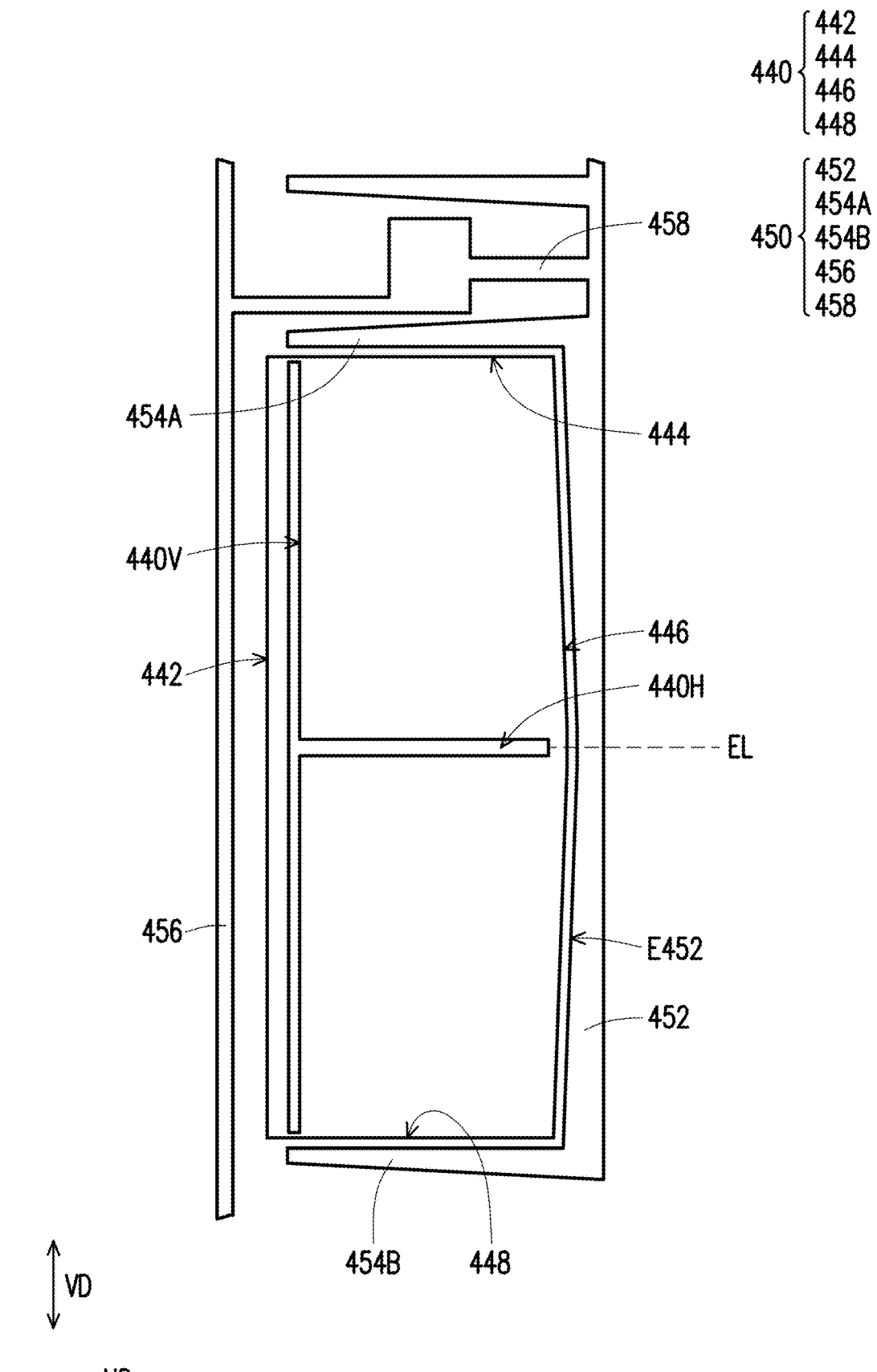
FIG. 10 is a schematic view of a pixel electrode and an alignment electrode in a pixel structure 400.

FIG. 10 is a schematic view of the pixel electrode and the alignment electrode in the pixel structure 400. Referring to both FIGS. 9 and 10, a pattern of the pixel electrode 440, for example, has a larger dimension in the longitudinal direction VD than a dimension in the transverse direction HD, and an outline of the pixel electrode 440 is substantially sequentially surrounded by a first long side 442, a first short side 444, a second long side 446, and a second short side 448 in a counterclockwise direction. In addition, the pixel electrode 440 has a first opening 440V and a second opening 440H, and the first opening 440V and the second opening 440H are connected to form a T shape. A design of the pattern of the pixel electrode 440 is substantially similar to that of the pixel electrode 340. However, the second long side 446 of the pixel electrode 440 is curve-like or polyline-like, and the first long side 442 is straight. In FIGS. 9 and 10, a distance between the first long side 442 and the second long side 446 in the pixel electrode 440, for example, along an extension direction of the first long side 442, that is, the longitudinal direction VD, shows a variation tendency of first increasing and then decreasing. In other words, the pixel electrode 440 has the design of the pattern that is wide in the middle and narrow at two ends.

The alignment electrode 450 is physically separated from the pixel electrode 440, and may include a first extension portion 452, a supplemental portion 454A, a supplemental portion 454B, a second extension portion 456, and a connection portion 458. The first extension portion 452 and the second extension portion 456 are positioned on opposite two sides of the pixel electrode 440. The first extension portion 452 is adjacent to the second long side 446 of the pixel electrode 440, and the second extension portion 456 is adjacent to the first long side 442 of the pixel electrode 440. The supplemental portion 454A and the supplemental portion 454B are both connected to the first extension portion 452 and extend from the first extension portion 452 toward the second extension portion 456, but a terminal of the supplemental portion 454A and a terminal of the supplemental portion 454B are not connected to the second extension portion 456. The first extension portion 452 and the second extension portion 456 have solid patterns. A width of the first extension portion 452 is not constant. The width of the first extension portion 452 shows a variation tendency of first increasing and then decreasing along the second long side 446 of the pixel electrode 440, and the extension line EL of the second opening 440H may traverse the narrow portion of the first extension portion 452. In this embodiment, an inner side E452 of the first extension portion 452 adjacent to the second long side 446 and the second long side 446 are both curve-like or polyline-like, and a distance between the inner side E452 and the second long side 446 is constant. In this way, a fixed distance may be maintained between the first extension portion 452 and the pixel electrode 440. In addition, fixed distances are also maintained between the supplemental portion 454A and the pixel electrode 440, and between the supplemental portion 454B and the pixel electrode 440. The design is similar to the design of the pixel structure 100.

Figure 11:
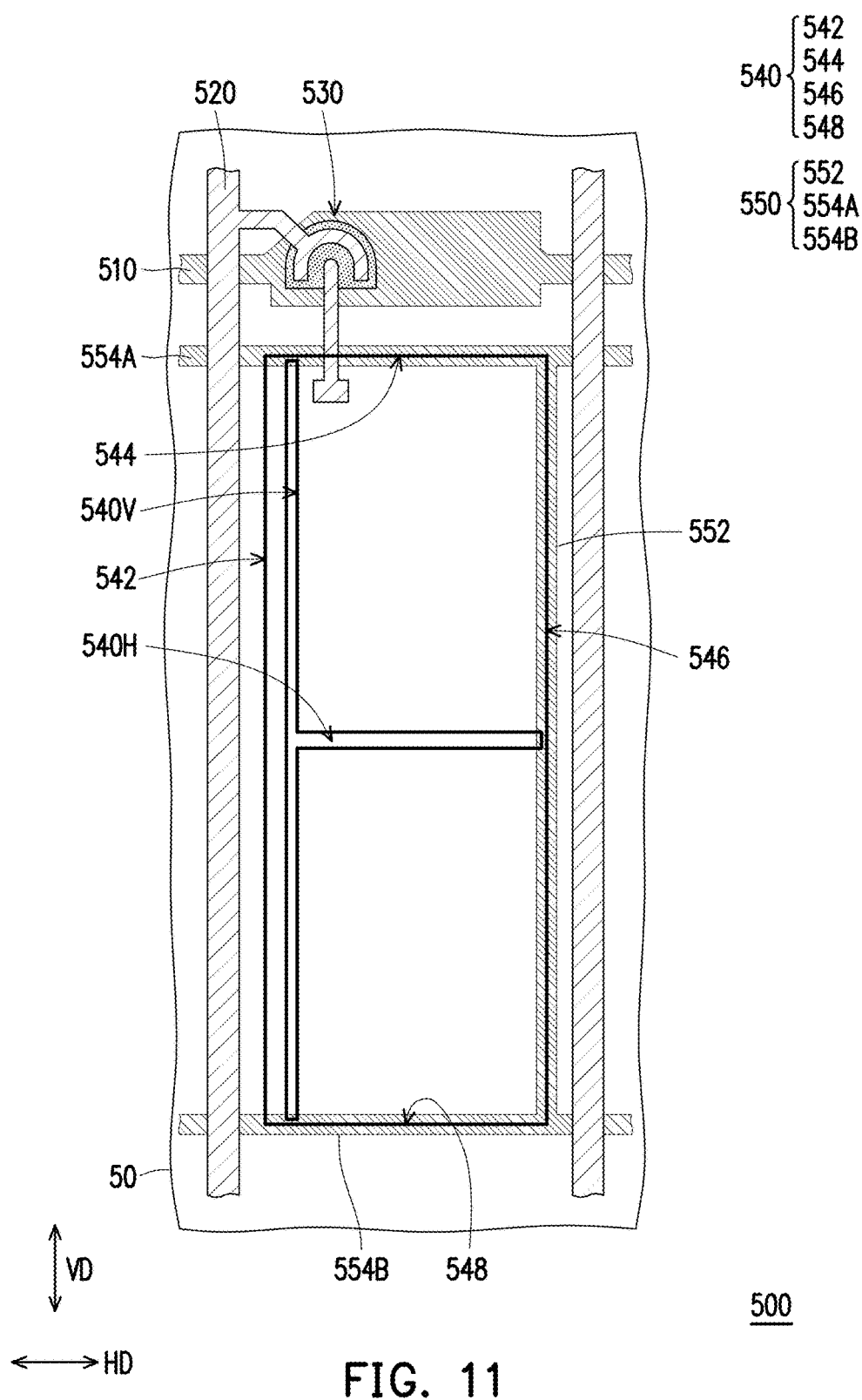
FIG. 11 is a schematic top view of a pixel structure according to still another embodiment of the disclosure.

FIG. 11 is a schematic top view of a pixel structure according to still another embodiment of the disclosure. A pixel structure 500 is, for example, disposed on a substrate 50, and the pixel structure 500 may include a scan line 510, a data line 520, an active device 530, a pixel electrode 540, and an alignment electrode 550. The scan line 510 intersects the data line 520. The active device 530 is connected to the scan line 510 and the data line 520, and the pixel electrode 540 is connected to the active device 530. An operation of the pixel structure 500 is substantially similar to those of the pixel structures 100, 200, 300, and 400 of the previous embodiments. However, in addition to defining an alignment state of a display medium, the alignment electrode 550 of the pixel structure 500 may also serve as the common electrode in the foregoing embodiments. In other words, the alignment electrode 550 and the pixel electrode 540 may form a storage capacitor to stabilize a voltage of the pixel electrode 540.

Figure 12:
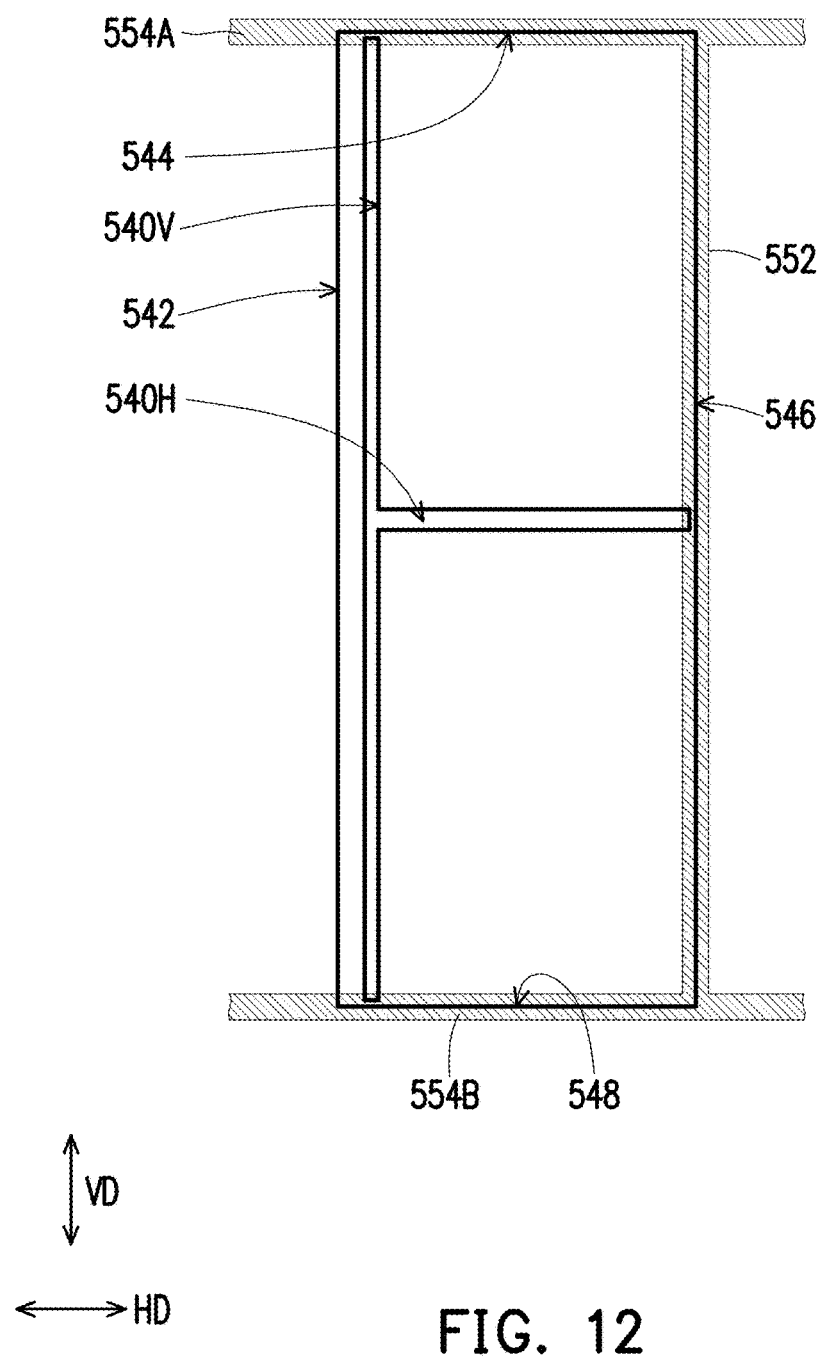
FIG. 12 is a schematic view of a pixel electrode 540 and an alignment electrode 550 in a pixel structure 500.

FIG. 12 is a schematic view of the pixel electrode 540 and the alignment electrode 550 in the pixel structure 500. The pixel electrode 540 is substantially similar to the pixel electrode 140 in the previous embodiment. The pixel electrode 540 has a larger dimension in the longitudinal direction VD than a dimension in the transverse direction HD, and an outline of the pixel electrode 540 is substantially sequentially surrounded by a first long side 542, a first short side 544, a second long side 546, and a second short side 548 in a clockwise direction. The pixel electrode 540 has a first opening 540V extending along the first long side 542 and a second opening 540H extending from the first opening 540V toward the second long side 546. Reference is drawn to the designs of the first opening 140V and the second opening 140H the in pixel structure 100 for the designs of the first opening 540V and the second opening 540H.

The alignment electrode 550 and the pixel electrode 540 may be formed by different film layers and are physically separated from each other. The alignment electrode 550 is mainly formed by an extension portion 552, a supplemental portion 554A, and a supplemental portion 554B. The extension portion 552 is disposed adjacent to the second long side 546 of the pixel electrode 540, and the supplemental portion 554A and the supplemental portion 554B respectively extend along the first short side 544 and the second short side 548 of the pixel electrode 540. In this embodiment, the first opening 540V and the second opening 540H of the pixel electrode 540 form a T-shaped pattern, while the extension portion 552, the supplemental portion 554A, and the supplemental portion 554B of the alignment electrode 550 form a U-shaped pattern. A bottom of the U-shaped pattern, that is, the extension portion 552, and a top of the T-shaped pattern, that is, the first opening 540V, are opposite to each other. The second opening 540H extends between the first opening 540V and the second long side 552. In addition, according to FIGS. 11 and 12, in a thickness direction (a viewing direction of the top view), the extension portion 552 at least partially overlaps the pixel electrode 540, and the supplemental portion 554A and the supplemental portion 554B also at least partially overlap the pixel electrode 540.

Based on the above, in the pixel structure of the disclosure, the T-shaped opening provided inside the pixel electrode is used with the U-shaped pattern of the alignment electrode. With such electrode patterns, when an alignment procedure is performed, in the display media such as a liquid crystal material, nodes that are unevenly arranged and/or tilted may be distributed outside the area of the pixel electrode. Such arrangement helps increase the effective display area of the pixel electrode as well as increasing the display transmittance.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:
1. A pixel stricture, comprising:
a pixel electrode, wherein an outline of the pixel electrode is surrounded by a first long side, a first short side, a second long side, and a second short side, and the pixel electrode has a first opening and a second opening, wherein the first long side is opposite to the second long side, the first short side is opposite to the second short side, the first opening substantially extends along the first long side, the second opening extends from the first opening toward the second long side, and a width of the first opening is smaller than a width of the second opening; and
an alignment electrode, physically separated from the pixel electrode, and comprising a first extension portion adjacent to the second long side and two supplemental portions positioned at two ends of the first extension portion, wherein the two supplemental portions extend from the first extension portion toward the first long side and respectively along the first short side and the second short side,
wherein the alignment electrode further comprises a second extension portion adjacent to the first long side, the first extension portion is spaced apart from the second long side by a first spacing distance, the second extension portion is spaced apart from the first long side by a second spacing distance, and the first spacing distance is smaller than the second spacing distance.

2. The pixel structure according to claim 1, wherein a terminal of each of the two supplemental portions is spaced apart from the second extension portion.

3. The pixel structure according to claim 1, wherein a spacing distance between the first extension portion and the pixel electrode is equal to a spacing distance between each of the two supplemental portions and the pixel electrode.

4. The pixel structure according to claim 1, wherein the first opening and the second opening are connected to form a T shape.

5. The pixel structure according to claim 1, wherein the width of the first opening is smaller than a spacing distance from the first opening to the first long side.

6. The pixel structure according to claim 1, wherein a width of each of the two supplemental portions gradually decreases outward from the first extension portion.

7. A pixel structure, comprising:
a pixel electrode, wherein an outline of the pixel electrode is surrounded by a first long side, a first short side, a second long side, and a second short side, and the pixel electrode has a first opening and a second opening, wherein the first long side is opposite to the second long side, the first short side is opposite to the second short side, the first opening substantially extends along the first long side, the second opening extends from the first opening toward the second long side, and a width of the first opening is smaller than a width of the second opening; and
an alignment electrode, physically separated from the pixel electrode, and comprising a first extension portion adjacent to the second long side and two supplemental portions positioned at two ends of the first extension portion, wherein the two supplemental portions extend from the first extension portion toward the first long side and respectively along the first short side and the second short side,
wherein the first extension portion has an extension portion opening located inside the first extension portion, a width of the extension portion opening increases toward a middle, and an extension line of the second opening traverses a wide portion of the extension portion opening.

8. A pixel structure, comprising:
a pixel electrode, wherein an outline of the pixel electrode is surrounded by a first long side, a first short side, a second long side, and a second short side, and the pixel electrode has a first opening and a second opening, wherein the first long side is opposite to the second long side, the first short side is opposite to the second short side, the first opening substantially extends along the first long side, the second opening extends from the first opening toward the second long side, and a width of the first opening is smaller than a width of the second opening; and
an alignment electrode, physically separated from the pixel electrode, and comprising a first extension portion adjacent to the second long side and two supplemental portions positioned at two ends of the first extension portion, wherein the two supplemental portions extend from the first extension portion toward the first long side and respectively along the first short side and the second short side,
wherein a distance between the first long side and the second long side shows a variation tendency of first increasing and then decreasing along an extension direction of the first long side.

9. The pixel structure according to claim 8, wherein a width of the first extension portion shows the variation tendency of first decreasing and then increasing along the second long side, and an extension line of the second opening traverses a narrow portion of the first extension.

10. The pixel structure according to claim 9, wherein an inner side of the first extension portion adjacent to the second long side and the second long side are curve-like or polyline-like.

11. The pixel structure according to claim 1, wherein the second opening evenly divides the pixel electrode.

12. The pixel structure according to claim 1, wherein the first extension portion at least partially overlaps the pixel electrode in a thickness direction.

13. The pixel structure according to claim 1, wherein a width of the first opening in the extending direction of the first short side or the second short side is smaller than a width of the second opening in the extending direction of the first long side or the second long side.

14. The pixel structure according to claim 7, wherein a width of the first opening in the extending direction of the first short side or the second short side is smaller than a width of the second opening in the extending direction of the first long side or the second long side.

15. The pixel structure according to claim 7, wherein a terminal of each of the two supplemental portions is spaced apart from the second extension portion.

16. The pixel structure according to claim 7, wherein a spacing distance between the first extension portion and the pixel electrode is equal to a spacing distance between each of the two supplemental portions and the pixel electrode.

17. The pixel structure according to claim 7, wherein the first opening and the second opening are connected to form a T shape.

18. The pixel structure according to claim 7, wherein the width of the first opening is smaller than a spacing distance from the first opening to the first long side.

19. The pixel structure according to claim 7, wherein a width of each of the two supplemental portions gradually decreases outward from the first extension portion.

20. The pixel structure according to claim 7, wherein the second opening evenly divides the pixel electrode.

21. The pixel structure according to claim 7, wherein the first extension portion at least partially overlaps the pixel electrode in a thickness direction.

22. The pixel structure according to claim 8, wherein a width of the first opening in the extending direction of the first short side or the second short side is smaller than a width of the second opening in the extending direction of the first long side or the second long side.

23. The pixel structure according to claim 8, wherein a terminal of each of the two supplemental portions is spaced apart from the second extension portion.

24. The pixel structure according to claim 8, wherein a spacing distance between the first extension portion and the pixel electrode is equal to a spacing distance between each of the two supplemental portions and the pixel electrode.

25. The pixel structure according to claim 8, wherein the first opening and the second opening are connected to form a T shape.

26. The pixel structure according to claim 8, wherein the width of the first opening is smaller than a spacing distance from the first opening to the first long side.

27. The pixel structure according to claim 8, wherein a width of each of the two supplemental portions gradually decreases outward from the first extension portion.

28. The pixel structure according to claim 8, wherein the second opening evenly divides the pixel electrode.

29. The pixel structure according to claim 8, wherein the first extension portion at least partially overlaps the pixel electrode in a thickness direction.

\* \* \* \* \*